United States Patent [19]

Rabian

[11] Patent Number: 5,171,957
[45] Date of Patent: Dec. 15, 1992

[54] GENERATOR FOR ELECTRIC DISCHARGE MACHINING OF METALLIC WORK PIECES BY MEANS OF AN ELECTRODE CONSISTING OF LIQUID OR SOLID MATERIAL

[76] Inventor: Laszlo Rabian, Casard 35, CH-1023 Crissier, Switzerland

[21] Appl. No.: 613,785
[22] PCT Filed: Jun. 6, 1990
[86] PCT No.: PCT/CH90/00142
§ 371 Date: Dec. 10, 1990
§ 102(e) Date: Dec. 10, 1990
[87] PCT Pub. No.: WO90/14917
PCT Pub. Date: Dec. 13, 1990

[30] Foreign Application Priority Data

Jun. 9, 1989 [EP] European Pat. Off. ............ 89110458

[51] Int. Cl.$^5$ .................................... B23H 1/02
[52] U.S. Cl. .......................... 219/69.130; 219/69.18
[58] Field of Search ............... 219/69.13, 69.18, 69.12, 219/69.19

[56] References Cited

U.S. PATENT DOCUMENTS

| | | | |
|---|---|---|---|
| 4,267,423 | 5/1981 | Bell, Jr. et al. | 219/69.19 |
| 4,361,745 | 11/1982 | Rupert et al. | 219/69.13 |
| 4,614,854 | 9/1986 | Obara et al. | 219/69.13 |
| 4,678,885 | 7/1987 | Dresti et al. | 219/69.13 |
| 4,800,248 | 1/1989 | Futamura et al. | 219/69.19 |

FOREIGN PATENT DOCUMENTS 0160989 8/1987 European Pat. Off. .
0202440 4/1988 European Pat. Off. .
2735403 12/1980 Fed. Rep. of Germany .

OTHER PUBLICATIONS

High Speed Pulse Discrimination for Real-Time EDM Analysis–D. Dauw et al, Belgium, no publication date.

Primary Examiner—Geoffrey S. Evans
Attorney, Agent, or Firm—Herbert Dubno

[57] ABSTRACT

An impulse generator for the spark erosive cutting of workpieces by electrodes of a liquid or solid medium, consists of a control circuit and a principal circuit. The control circuit contains: the control circuit contains an oscillator, reduction stages for the generation of elements which belong to the impulse signal, a counter for the addressing of impulse signal, a memory of a feedback circuit which detects the electrical conditions in the working gap, and a ROM with programmed memory locations, which are addressed by the counter according to the addresses of the impulse elements and by memory according to the addresses of the electrical conditions in the working gap, whereby the contents of the memory locations generate an output signal or no output signal. The principal circuit contains two electronic switches for the generation of a working impulse in the working gap when an output signal is present, and a control circuit which inhibits only one of two electronic counters.

7 Claims, 1 Drawing Sheet

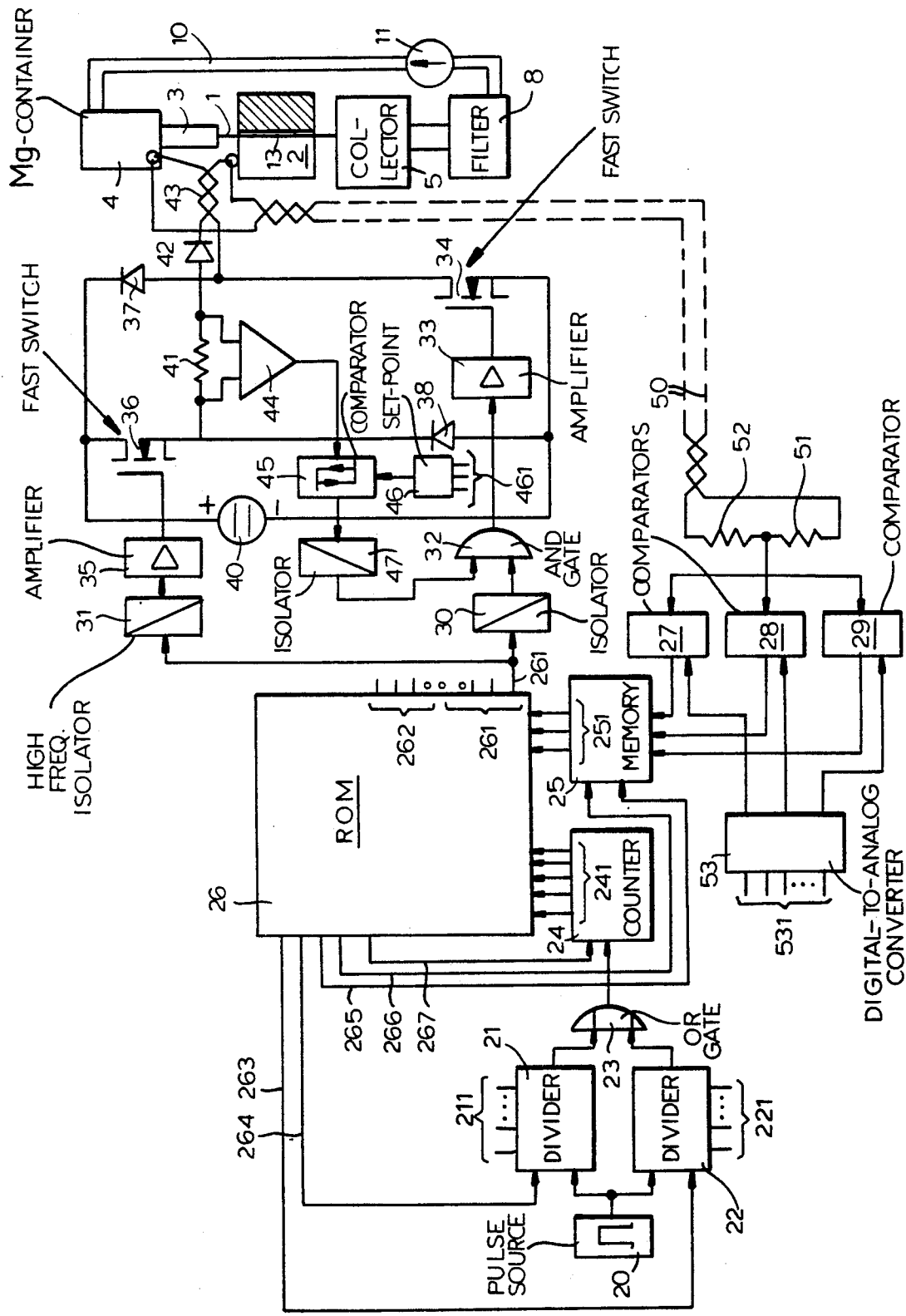

GENERATOR FOR ELECTRIC DISCHARGE MACHINING OF METALLIC WORK PIECES BY MEANS OF AN ELECTRODE CONSISTING OF LIQUID OR SOLID MATERIAL

CROSS REFERENCE TO RELATED APPLICATIONS

This application is a National Phase application of PCT/CH90/00142 filed Jun. 6, 1990 and based up on EP 89 110458.0 filed Jun. 9, 1989 under the International Convention.

FIELD OF THE INVENTION

The present invention relates to generator for electric discharge machining of metallic workpieces by means of an electrode of liquid or metallic material, whereby electrode and workpiece are separated from one another for a working gap, which generator contains a principal circuit for the generation and transmission of impulses to electrode and workpiece.

BACKGROUND OF THE INVENTION

In EDM (electric discharge machining) technology, various pulse generators are used depending on the task at hand. For EDM cutting, deionized water is primary used as dielectric because of its good properties, in particular in view of the good material removal properties as to the workpiece. For the attainment of maximum material removal, the pulse generator must have certain properties.

Known pulse generators exhibit, when deionized water is used as the dielectric in the working gap, the disadvantage that the potential maximum material removal per unit of discharge energy cannot be attained because the duration of the pulse cannot be made substantially shorter than 1 microsecond, and the decay curve of the current pulse cannot be made sufficiently steep. This is due to the fact that the electrical output elements used in the principal circuit of the pulse generator for current limitation and current control cannot follow the requisite short pulse duration and steep decay curve.

A pulse generator for wire EDM which can furnish short pulses of one microsecond and high currents of several hundred amperes is described in German patent No. 2,735,403. A further shortening of the pulses and a further increase in the steepness of the decay curve is not possible resistances because of the stray inductivity of the output. Furthermore, this pulse generator exhibits, because of the output resistance, an economically unacceptable loss of efficiency.

To avoid these disadvantages, a pulse generator is described in the European Pat. No. 160,989 which has a good efficiency, because it exhibits inductivity in the principal circuit in place of the output resistance. For this reason, neither the desired short pulse duration nor the steep decay curve can be improved with this generator to the extent that the pulse duration lies at 0.1 microsecond and the decay curve of the current pulses lies at over 1000 amperes per microsecond. This derives from the fact that the working current must flow via at least five switching elements.

OBJECTS OF THE INVENTION

It is the object of the invention to avoid the disadvantages of the known pulse generators, particularly for EDM cutting and, furthermore, to assure that a pulse duration down to 100 nanoseconds and an incline of the delay curve to several 1000 amperes per microsecond can be achieved, thereby increasing the material removal per unit of discharge energy, increased.

It is a further object of the invention to provide a pulse generator whereby the fast interruption of the current, eliminates deleterious effects of short circuit pulses and arcing on the surfaces of the workpiece and electrode.

As is known, the spark erosive discharges follow statistical laws. The working pulses, idling impulses, short circuit pulses the degenerate pulses (e.g. arcs) are distributed statistically. Their sequence is uncorrelated. It is known that the short circuit and degenerate pulses cause deterioration of the surface of the workpiece and are greatest cause of wear of the electrode. For a wire electrode, this means that a high wire velocity must be used with the danger of wire breakage.

SUMMARY OF THE INVENTION

These objects are attained by a pulse generator subscribing to the following conditions:

the principal circuit does not contain passive output elements, but only at least two fast electronic switches and diodes in at least equal number;

a sensing element which is allocated to the line to the working gap, which measures the current strength of every pulse, and in cooperation with a comparator acts upon one of the two switches during the duration of the working pulse;

a means of interrogation interrogates each working pulse acting upon the working gap several times during its pulse duration; and an inhibit means controlled by the interrogation means inhibits the pulses to the working gap only upon an undesired pattern of development.

The sensing element arrayed in the line to the working gap which measures the current intensity of every pulse, acts in conjunction with a source of nominal current intensity via a comparator upon the input to an AND gate, whereby the other input to the AND gate receives a signal via a preprogammed memory controlled by the mans of interrogation only when the pulse acting in the working gap has the desired pattern of development.

The inhibit means contains a ROM with a program so fashioned that at its output the control voltage for the pulse in the working gap arises only when the working pulse exhibits a desired and predetermined development pattern. The ROM is addressed by the following means:

a counter which determines the interrogation steps (t1, t2, t3, t4 . . . . . tN) in time; and a memory which stores the developing levels of a working pulse in the working gap.

The counter which determines the timed interrogation steps is controlled by a control circuit. The control circuit contains a source of pulses with a frequency higher by a multiple than that of the working pulses, and frequency reduction stages for the definition of the interrogation times during the width and the interval of the working pulse signals.

Comparators are provided for the measurement of the level of the working pulse, for the measurement of the level of the working pulse, whose one input is connected to the workpiece and to the pressure container of the electrode, and whose other input is connected to a source of nominal value, whereby for every level one comparator is provided.

The principal circuit can contain two electronic switches, both of which in the conducting sate generate the rise curve of a working pulse and in simultaneous nonconducting state generate the decay curve of the working pulse.

A sensing element is provided in the line to the working gap for the control of the amplitude of the working pulse, and tis comparator, to actuate in conjunction with the output signal of the ROM one of the two electronic switches.

At least two principal circuits can be connected at the working gap and each principal circuit can contain one uncoupling diode in its lines to the working gap.

With parallel arrangement of such principal circuits at the working gap, each principal circuit receives its pulse signals form a different output of the ROM.

The control circuit can contain:
one high-frequency oscillator;
reduction stages for the generation of elements which belong to an impulse signal;
a counter for the addressing of impulse signal elements;
a memory of a feedback circuit which senses the electrical conditions in the working gap, which memory addresses each condition; and
a ROM with programmed memory locations, which are interrogated by counter in accordance with the addresses of the input signal elements and by memory according to the addresses of the electrical conditions in the working gap, whereby the contents of the memory locations interrogated either generate an output signal or not output signal.

The principal circuit can contain:
two electronic switches for the generation of a working impulse in the working gap in the presence of an output signal;
a control circuit which, when a certain current level is exceeded in the working gap, inhibits only one of the two electronic switches, whereby the stray inductivity of the circuit enables the flow of the current in the new direction, which can occur several times during one working pulse; and
an array of output diodes for a certain direction of current flow into the source of DC for the generation of a steep decay curve of the working pulse.

BRIEF DESCRIPTION OF THE DRAWING

The sole FIGURE of the drawing shows a schematic of the pulse generator according to the invention.

SPECIFIC DESCRIPTION

The drawing shows a machine for spark erosive cutting, which consists of an impulse generator and the cutting means.

The cutting means is desired, in which, the pulse generator in the sense of the invention furnishes the working pulses. A stream electrode is used for the cutting of the workpiece, as is described in greater detail in the European patent application No. 292 440 (See also U.S. Pat. No. 4,980,533 of Dec. 25, 1990). Therefore the stream electrode and the appliances necessary therefor are dealt with in the following only briefly.

The stream electrode consists of a liquid medium, e.g. mercury, housed in pressure container 4. The nozzle 3 attached to the pressure container gives the desired cross section, e.g. circular, to the stream electrode 1.

The electrode 1 issues under high pressure from the nozzle 3 in form of a stream. This electrode realized as a stream is utilized for the cutting of the workpiece 2. Stream electrode 1 and workpiece 2 are relatively displaced by guidance means not shown so that the desired contours are cut in the workpiece. For completeness' sake it will be mentioned that stream electrode 1 and workpiece 2 are always separated from one another by a working gap 13 containing, in known manner, a dielectric. In the present case the dielectric is deionized water.

Should stream electrode and workpiece approach each other too closely or even touch, then undesired degenerate pulses or short circuits will arise. With an excessive gap, undersired idling pulses will arise. As is known, the pulse shaped discharges in the working gap 13 obey stochastic laws. Working pulses, short circuit pulses idlin pulses, and degenerate pulses (arcs) are distributed statistically. Their sequence is uncorrelated. The short circuit pulses and degenerate pulses degrade the surface of the workpiece and cause undesired wear of the electrode. However, the latter rap plies only to an electrode of solid material, such as e.g. copper, brass, steel. In the stream electrode used in described embodiment this wear does not occur. The stream electrode 1 issues under high pressure from nozzle 3, arrives in the working gap of workpiece 2, cuts the desired contour in workpiece 2 and is collected in the receptacle 5. The liquid electrode material is cleaned in the attached filter 8 and is transported by means of pump 11 via pressure conduit 10 into the pressure container 4 where the material is available for reuse.

The pulse generator of this invention, which generates pulses of extremely short time duration (down to 100 nanoseconds) with particularly steep decay curves (up to several 1000 amperes per microsecond) and applies them across the working gap 13, consists of a control circuit for the generation of the pulse signals and a principal circuit controlled by the control circuit for the generation of the working pulses for the working gap.

The control circuit comprises a source 20 of pulses with a pulses repetition frequency between 10 MHz and 50MHz, and frequency reduction stages 21, 22, whose outputs go to an OR gate 23. The pulse source 20 is available e.g. as quartz oscillator from the firm SARONIX under order No. NCT-070C40. The two reduction stages, of which the one, 21 is provided for the control pulse and the other, 22, for the interval between two control pulses, can be obtained e.g. under order No. SN74/L6292 from the firm TEXAS Instruments.

Each of the two reduction stages is equipped with the inputs 211 or 211. The inputs 211 control in the reduction stage 21 the desired reduced frequency for the pulse signals. The inputs 221 control in reduction stage 22 the desired reduced frequency for the interval signals. Outputs 263, 264 of the ROM 26 are synchronization outputs which assures that the impulses signals and interval signals arrive at different times at the binary counter 24 via the OR gate 23, so that they do not interfere with one another. Furthermore, via outputs 263, 264 it is assured, in cooperation with counter 24, that a certain number of pulse signals or interval signals, sequential in time, arrive at the binary counter 24 and thus form the width of a pulse or an interval. In other words, this means that each pulse signal represents a pulse bit and each interval signal an interval bit given number of bits yields the width of the machining pulse or the interval. Each bit is added in the binary counter. The instantaneous content of bits in the binary counter forms, by means of its outputs 241, the first part of a line address in binary form for the ROM 26. The second part of the line address, also in binary form, is furnished to the ROM 26 by the outputs 251 of a memory 25. The second part of the line address contains the instantaneous electrical conditions or relationships in working gap 13, as will be explained in greater detail below. The binary counter 24 is designed for high frequencies (e.g. 10 MHz to 50 MHz) and can be obtained, e.g. as an integrated circuit from TEAX Instruments under order No. Ser. No. 74/AS869.

In the embodiment shown, the binary counter has five outputs 241 connected to ROM 26, so that it can generate 32 different addresses in binary code. In other words, it can add up to 16 impulse bits for a single pulse, or up to 16 bits to a single interval. If desired, the number of outputs 241 and thus also the number of bits can be increased or decreased. In the present case, 16 bits have been chosen for one machining pulse apportionment between pulse and interval. For an asymmetrical apportionment, e.g., 6 bits for the impulse and e.g. 16 bits for the interval can be provided. To each bit a certain time element t1, t2, 53, t4 . . . . . . . . . tN can be assigned. For each bit or for each time element there occurs the addressing for the memory locations in ROM 26. Each pulse or each interval is addressed as often as there are bits summarized for one pulse or one interval.

The memory 25, already mentioned, which furnishes via its outputs 251 and the second part of the line address for the ROM 26, belongs to a feedback circuit 27, 28, 29, 50, 51, 52, 53 which monitors the electro-erosive conditions in the working gap 13. The operating principle of such feedback circuits has already been described in the year 1977 for the statistical evaluation of impulses which occur during the EDM work in a working gap. See lecture "Analysis of the EDM process, by R. Snoeys, H. Cornelessen, J. B. Kruth, delivered at the "International Symposium for Electromachining (ISEM) in Wolfberg, Switzerland, from Jun. 21, to Jun. 24, 1977, published by Juris Druck and Verlag, Zurich, Switzerland.

In the construction and operation of the feedback circuit 27, 28, 29, 50, 51, 52, 53 are different and adapted to the EDM generator according to the invention. The lines 50 connect the pressure container 4 of the stream electrode 1 and the workpiece on the one hand, via resistors 51, 52 with three comparators 27, 28, 29 on the other.

The working pulses appearing in the working gap 13 are fed to the comparators via line 50. Each of the comparators is set for a certain level of amplitude of the working pulse. This output can be treated as a voltage or a current signal. The comparator 27 detects e.g. the high ignition voltage $U_H$. The next comparator 28 detects e.g. the lower burning voltage $U_X$. The third comparator 29 detects the short circuit voltage $U_L$. These three voltage values characterize the pulse types occurring in the working gap 13, e.g. as working pulses with initially high ignition voltage and low burning voltage, short circuit pulses, and degenerate pulses such as idling pulses or pulses which in their width or time duration change from one type to another type. Of course, more than three voltages values can be considered for the characterization of the types of working pulses. This then would require a higher number of comparators. The three comparators 27, 28, 29 are of identical construction and can be obtained from the firm TEXAS Instruments as integrated circuits with digital output for memory 25 under order No. TL712. The frequency range lies between 10 MHz and 50 MHz.

The comparators compare continuously the voltage values occurring in the working gap 13 with the NOMINAL (set-point) values which are fed into each comparator by the coordinated digital-to-analog converter 53 via the analog converter input. For simplicity's sake, only one such converter is shown in the drawing. The desired voltage values of the working impulses, which are input in the operating console, not shown, or the CNC control, not shown, of the input generator under the invention, are supplied to the converters 53 via inputs 531. The digital-to-analog converters 53 can be obtained from the firm TEXAS Instruments as integrated circuits under order No. TLC75224. At the outputs of the comparators 27, 28, 29 the results of the comparisons are continuously present in the form of digital signals, specifically in the following manner:

working voltage < NOMINAL value = High Signal
working voltage > NOMINAL value = Low Signal.

These signals arrive as inputs at the memory 25, which interrogates and addresses them during the time elements t1, t2, t3, t4 . . . . . . . . . tN. This occurs via the intermediate signal 265 and inhibit signal 266 from ROM 26. In every time element t1, t2, t3, t4 . . . . . tN there is an intermediate signal at memory 25, which accepts the values from comparators 27, 28, 29, addresses them, and transmits them as respective second address portions together with the first address portion to the ROM. At the end of an impulse signal and interval signal consisting of several bits the inhibit signal 266 appears from the ROM, which inhibits and resets the memory. At the same time the ROM generators a further inhibit signal 267, which inhibits and resets counter 24. The inhibition of the counter 24 and the memory 25 is lifted by the next bit.

The ROM 26 is programmable (PROM) and can, e.g. be obtained as an integrated circuit from the firm TEXAS Instruments under order No. TBP38S22. Its columns are programmed and its lines are addressed by counter 24 and memory 25. The binary coded output signals from counter 24 and memory 25, which are fed to the ROM 26 via eight lines, yield a total of 256 addresses in the ROM, which is more than sufficient for the pulse generation. Upon special request it is possible to increase or decrease the number of memory locations.

In the ROM illustrated, the memory locations exhibit a certain program pattern. Only those memory locations are programmed with a content which correspond to the development of desired working pulses which in actuality result in a very good electro-erosive material removal on the workpiece 2. The other memory locations correspond to the development of working pulses which cause little or no electro-erosive material removal on workpiece 2 or which can disturb the electrode or workpiece 2, and therefore have no content which equates to an interval. In this manner all the working, short circuit, idle and degenerate pulses and the transitions between the various types of impulses which may occur in working gap 13 are taken in consideration.

The ROM 26 generates a high signal (H) in its output 261 only when each of the memory locations addressed by the counter 24 and the memory 25 has a programmed content. When of these locations addressed only a single one has no content, them the ROM 26 generates a low signal (L) at its output 261. The output signal 261 goes to the principal circuit 20 to 46 which, upon receiving a high signal (H) generates a working pulses for working gap 13 (electronic switches 34, 36 are in a conducting state) and upon a low signal (L) does not generate a working pulse (electronic switches 34, 36 are in an inhibited state).

The output signal defines the time duration of a working pulse and of an interval in the working gap 13. Since counter 24 addresses every signal pulse and every signal pulse interval as often as elements (bits) or time elements t1, t2, t3, t4 . . . . tN are present (determined by the reduction stages 21, 22) and since memory 25 in the same rhythm (intermediate signal 265, reset signal 266) addresses the values concerning the actual conditions of the electrical state in the working gap 13, then in every time element t1, t2, t3, t4 . . . . . .tN certain memory locations of ROM 26 are addressed, whose content determines whether a high signal (H) or a low signal (L) appears at output 261.

This cooperation between counter 24, memory 25 and ROM 26 has the advantage that the electrical state in the working gap 13 is interrogated several times during the duration of an pulse or an interval. The output signal 261 shows in every time element t1, t2, t3, t4, . . . . . tN the result of the interrogation. If the electrical state in the working gap is in order, (then the same output signal is generated in every time element. If the electrical state in the working gap changes, then the output signal changes at the point in time when the change of state occurs. This takes place within 200 nanoseconds. This means that even at the beginning of a working pulse or of an interval) the correct countermeasures are taken by means of the output signal 261 of ROM 26. In other words it can be said that the tendency of a good working pulse to change in an undesired bad direction is recognized and stopped immediately. Thus undesired working pulses which would reduce or even prevent material removal on workpiece 2 or which increase wear on the electrode, do not have any effect, so that the maximum material removal per unit of discharge energy is achieved.

The ROM 26 contains not only the output 261, but also several outputs 261 shown by dotted lines. These dotted line outputs are provided for further principal circuits which are connected in parallel to the principal circuit shown. This arrangement is intended for several electrodes 1 in parallel operating upon one workpiece 2, or for several electrodes 1 and several workpieces 2 in parallel. In the first case, several electrodes and one workpiece cooperate. In the second case, several electrodes and several workpieces cooperate in pairs. When several principal circuits are arrayed in parallel, then each principal circuit has an decoupling diode 42 at the beginning of the line 43 to the electrode and the workpiece. The ROM 26 contains several additional outputs 262, in which synchronizing signals e.g. for an adaptive servo feed of the electrode 1 and/or of the workpiece 2 can be provided. This adaptive servo control, which is not shown, has the purpose e.g. of advancing the electrode upon progressive electro-erosive material removal from the workpiece 2, so that the same working gap 13 is maintained. The amount of the burning voltage of the working impulses effecting the material removal is sensed by sample and hold amplifiers, which amplifiers require the output signal 262 for an acquisition time window. This time window can only contain the burning voltage, but not the beginning and the end of the working pulse (ignition time delay and shut-off curve). Such output signals 262 are easily programmable in ROM 26.

The operation of the principal circuit is explained next. As already mentioned several times, the output signal 261 of the ROM 26 controls the generation of the working pulses in the principal circuit by rendering the two fast electronic switches 34 and 36 condition conducting condition. The switches 34, 36 are in a conducting condition only as long as the output signal 261 is present. Upon absence of the output signal the switches 34, 36 are inhibited, so that in the working gap 13 no working pulse can exist. This also applies to the development of an undesired type of working pulse.

The principal circuit is fashioned in such manner that the working impulses maintain the preset NOMINAL current amplitude, and have an extremely steep decay curve. This will be explained in detail further below. The output signal 261 being present, the signal is transmitted to amplifier 35 and AND-gate 32 via a galvanic isolating element 30, 31 for high signal frequencies, which may be constructed as a fiber optic signal transmitter, as an optical signal coupler or as a signal isolation transformer. The amplifier 35 renders the electronic switch 36 conducting. The switch 36 can be a MOSFET transistor or a group of MOSFET transistors.

The AND gate 32 renders the other electronic switch 34, which can also be a MOSFET transistor or a group of MOSFET transistors, and is designed for high frequencies, conductive via amplifier 33 only when at the other input to the AND gate 32 a voltage exists at the same time. This is always the case when the current values of the working impulse lie below a predetermined NOMINAL or set-point value, which is achieved via sensing resistor 41, amplifier 44, comparator 45, source of NOMINAL value 46, galvanic isolating element 47. The galvanic isolation elements 30, 31, 47 are constructed identically and can be obtained as integrated circuits from the firm Hewlett Packard under order No. HCPL 2400. At the presence of the output signal 261, switch 36 is always in a conducting state, while the other switch 34 is put into conducting state only by the existence of a second condition; to which must be added that switch 34 can change its condition (conducting or inhibited) several times during the period where switch 36 is conducting, or, expressed differently, while the output signal 261 is present.

At every working pulse (in presence of the output signal 261) the current flows in the principal circuit in three different paths in partly different directions. At the appearance of the pulse signal 261 and, when no or little current flows in the working gap 13, the switches 34, 36 go conducting. The current flow from the plus terminal of the DC source 40, which can have a supply voltage from 100 V to 1000 V, via switch 36, sensing resistor 41, output diode 42, with an inhibit delay time of 35 nanoseconds, line 43, which has low inductance and is made of HF braid, working gap 13 switch 34 to the minus terminal of the DC source 40.

The sensing resistor transmits the value of the current via its amplifier 44 to comparator 45, which compares the ACTUAL value with the NOMINAL value of the NOMINAL-value-source 46. If the ACTUAL value is the NOMINAL value, then the control voltage which is fed to the second input of the AND gate 32 via the galvanic isolation element 47 persists, so that switch 34 still remains in a conducting state. If the current value measured by the resistor 41 rises above the NOMINAL value, then the control voltage is removed from the second input to the AND gate 32. Switch 34 is inhibited. In this case the current flows along its second path via output diode 37 with an inhibit delay time of 35 nanoseconds. The flow of current through this diode is made possible due to a slight increase in voltage, which was caused by the stray inductances of the lines 43 and the working gap 13. The current flows from the output diode 37 via the conducting switch 36, resistor 41, output diode with an inhibit delay time of 35 nanoseconds, line 43, work piece 2, working gap 13 etc. This current will flow until its current value has dropped below the NOMINAL value. Then switch 34 becomes conducting again, so that the current can flow again in its first path.

The NOMINAL values, which the programmable source of NOMINAL value 46 furnishes to comparator 45 for the work impulse in question, are fed by the microprocessor control according to the program of work. This is symbolized by lines 461. The source of NOMINAL value 46 for the amplitude of the working impulses can be designed as a digital-to-analog converter and is available from the firm TEXAS Instruments under order No. TLC 7524 as integrated circuit. The current flows on its third path as soon as the output signal 261 has disappeared and the two switches 34, 36 are non-conducting. It flows from workpiece 2, working gap 13, electrode 1, line 43, output diode 37 into the DC source 40, output diode 38 with inhibit delay time of 35 nanoseconds, resistor 41, output diode 42. Because the DC source 40 has a large capacity and the current flows in opposite direction into the source, an extremely steep decay curve of the working impulse of several 1000 amperes per microsecond is attained.

I claim;

1. A generator for electric discharge machining of a workpiece with an electrode across a working gap, comprising:
   a principal circuit free from passive output elements and comprising:
   at least two fast electronic switches in circuit between a machining current source and said gap,
   a respective diode in series with each switch, said principal circuit passing machining current working pulses through said gap for respective working pulse durations and with respective working pulse intervals between said working pulses,
   a sensing element operatively connected to said gap and monitoring current strength for each of said working pulses, and
   comparator means connected to said sensing element and acting upon one of said switches in response thereto for terminating a working pulse in response to said sensing element; and
   a control circuit for said principal circuit and including:
   a preprogrammed memory storing information representing status of pulses in said gap,
   interrogation means interrogating each of said working pulses a plurality of times during each working pulse duration and comparing a parameter of the interrogated working pulse with a value representing pattern of development of a working pulse, said interrogation means including means for addressing said memory, and
   means connected to said memory and effective upon addressing thereof to control one of said switches and inhibit application of a working pulse to said gap only upon undesired development of said pattern.

2. The generator defined in claim 1 wherein said comparator means is provided with a source of set-point current strength and is connected to one input of an AND gate controlling said one of said switches acted upon by said comparator means, said memory being connected to another input of said AND gate.

3. The generator defined in claim 1 wherein said memory is a ROM having a program such that a control voltage is generated to produce a working pulse only when the working pulse has a desired predetermined development pattern, and said interrogation means includes a counter determining interdigitation steps in time connected to said ROM, and an address memory storing developing levels of a working pulses in said gap and connected to said ROM.

4. The generator defined in claim 3 wherein said interrogation means includes a pulse generator with an output frequency greater than a frequency of said working pulses by a multiple thereof and frequency reduction stages between said pulse generator and said counter for defining interrogation times during said pulse duration and said interval.

5. The generator defined in claim 3 wherein said interrogation means includes a plurality of comparators for measurement of a level of said working pulses, one input of each of said comparators being connected across said gap and another input connected to a source of a set-point value, one of said comparators being provided for each of the levels measured.

6. The generator defined in claim 1 wherein said electronic switches are so connected between said source and said gap that they generate a rise curve of a working pulse wherein both switches are in a conducting state and generate a decay curve of the respective working pulse when both switches simultaneously are in nonconducting states.

7. The generator defined in claim 1 wherein a plurality of such principal circuits are connected in parallel to said gap and each of said principal circuits is isolated from the others by a decoupling diode.

* * * * *